Dec. 23, 1924.
F. W. CRESS
1,520,334
CONTROL FOR BATTERY CHARGING PLANTS
Filed April 28, 1922
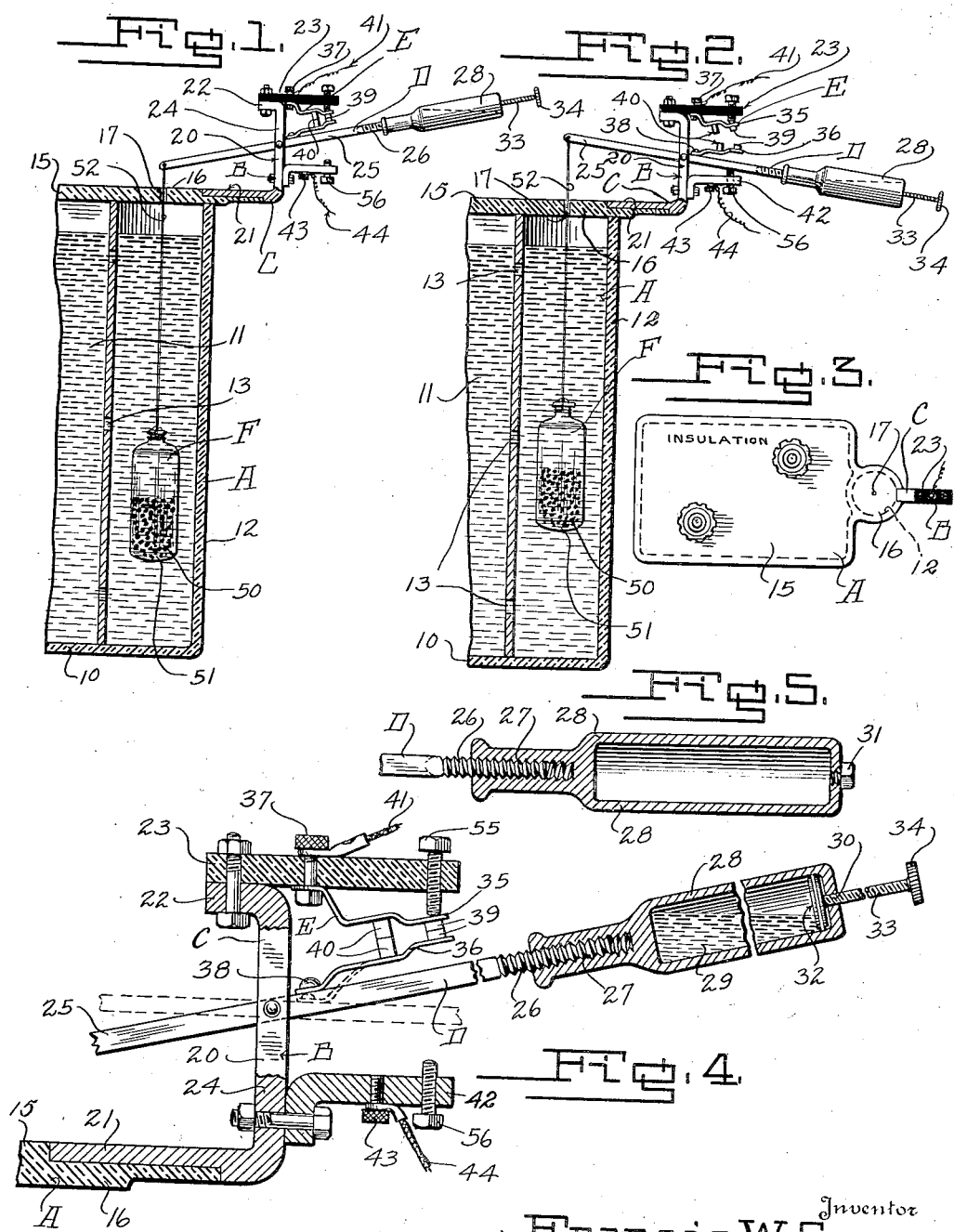
Inventor
Francis W. Cress
By Lancaster and Allwine
Attorneys Patented Dec. 23, 1924.

1,520,334

UNITED STATES PATENT OFFICE.

FRANCIS W. CRESS, OF PRIOR LAKE, MINNESOTA.

CONTROL FOR BATTERY-CHARGING PLANTS.

Application filed April 28, 1922. Serial No. 557,194.

*To all whom it may concern:*

Be it known that I, FRANCIS W. CRESS, a citizen of the United States, residing at Prior Lake, in the county of Scott and State of Minnesota, have invented certain new and useful Improvements in Controls for Battery-Charging Plants, of which the following is a specification.

This invention relates to storage batteries, and the primary object of the invention is to provide means for automatically starting the operation of a storage battery charging plant when a storage battery is discharged, for charging the same, and means for automatically stopping the operation of the storage battery charging plant when the storage battery is recharged.

Another object of the invention is the provision of a hydrometer controlled switch for automatically controlling the operation of a storage battery charging plant, the switch being adapted to be closed by the lowering of the hydrometer when the battery is discharged and when the specific gravity of the electrolyte in the battery falls below a predetermined degree for starting the operation of the storage battery charging plant and to be opened by the hydrometer when the hydrometer rises and the battery is charged and the specific gravity of the electrolyte rises above a predetermined degree for stopping the operation of the storage battery charging plant.

A further object of the invention is to provide an improved control for storage battery charging plants embodying a rockable circuit closing lever, a hydrometer connected to one end of the lever, and a weight secured to the other end of the lever to compensate for the change in the specific gravity of the electrolyte in which the hydrometer is immersed, whereby the outer end of the lever will be pulled down upon the raising of the hydrometer for breaking the circuit when the battery is charged.

A further object of the invention is to provide an improved control for storage battery plants embodying a movable circuit closing lever and a hydrometer for causing the actuation of said lever, and a novel means associated with the lever for permitting the quick making and breaking of the circuit closer or switch by said lever when the lever reaches a predetermined point.

A further object of the invention is the provision of means for shifting the center of gravity of a mass due to the descension or ascension of a hydrometer for quickly making and breaking the circuit when the lever carrying the shiftable mass is actuated by the hydrometer, the lever having means for changing the center of gravity of the mass on the lever for regulating the action of the lever for making or breaking the circuit.

A still further object of the invention is to provide a novel means for controlling a battery charging plant of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more fully described, claimed and illustrated in the accompanying drawings, forming a part of this specification, in which drawings:

Figure 1 is a fragmentary vertical sectional view through one end of a battery, showing the improved control for the battery charging plant incorporated therewith, and illustrating the position of the controlling lever and the hydrometer when the battery is discharged.

Figure 2 is a similar view illustrating the position of the controlling lever and the hydrometer, when the battery is charged.

Figure 3 is a plan view of a battery jar cover constructed in accordance with the invention.

Figure 4 is an enlarged longitudinal section through the improved control, showing the lever in position for closing the circuit for causing the operation of the storage battery charging plant.

Figure 5 is a detail longitudinal section through a slightly modified form of control lever.

Referring to the drawings in detail, wherein similar reference characters designate corresponding parts throughout the several views, the letter A indicates a storage battery; and B, the improved control associated therewith for the storage battery charging plant.

The storage battery A is, of course, of any preferred type and includes a jar 10, containing the usual amount of electrolyte 11.

One end of the jar 10 is provided with a cylindrical extension 12, which extends vertically on the same. The cylindrical extension 12 is provided with openings 13 for establishing communication between the same and the battery jar to permit the free circulation of the electrolyte between the jar and extension. The jar 10 can be provided with a cover 15. As shown, this cover is provided with a circular extension 16 at one end thereof to overlie the cylinder 12, and an opening 17 is formed in the axial center of the circular extension 16, for a purpose which will hereinafter be more fully described.

The improved control device B consists of a supporting frame C, an actuating lever D for controlling the opening and closing of the circuit maker and breaker E, and the hydrometer F for operating the control lever D.

The supporting frame C includes a bracket 20, which is preferably formed of electric conducting material, and this bracket is of a U-shape and has its lower arm 21 secured in any preferred manner to the circular extension 16 of the battery cover 15. The upper arm 22 of the bracket 20 is formed relatively short and has bolted thereto a block of insulation 23, for a purpose which will hereinafter more fully appear. The connecting portion 24 for the arms 21 and 22 of the bracket 20 has pivotally secured thereto intermediate its ends, by means of a pivot pin 25, the control lever D which will now be described.

The control lever D is preferably formed of electric conducting material, and the inner end thereof terminates directly above the opening 17 formed in the circular disc shaped extension 16 of the cover 15. The outer end of the control lever D is provided with external threads 26 for engaging in the internally threaded neck 27 of a vessel 28, which is provided for receiving the shiftable mass 29, which can be of mercury, a solid ball, or the like. The outer end wall of the receptacle 28 can be provided with a threaded opening 30 to permit the introduction of the shiftable mass therein, and this opening may be closed by a plug 31 as clearly shown in modified form of the control lever illustrated in Figure 5 of the drawing. It is obvious that by adjusting the vessel 28 inwardly or outwardly on the lever D, the center of gravity of the lever can be changed.

The provision of the shiftable mass 29 within the vessel 28 will be hereinafter more fully described, but it is obvious that its main object is to compensate for the change in the specific gravity of the electrolyte for pulling down the outer end of the lever when the hydrometer raises to open the circuit. The movement of the shiftable mass 29 within the vessel 28 can be limited by means of a plunger 32, which is carried by an adjusting rod 33, which can be threaded in the threaded opening 30. The adjusting rod 33 can be provided with an operating handle 34. It is obvious that by confining or limiting the movement of the mass within the vessel 28, the center of gravity can also be changed within certain limits.

The circuit closing or making and breaking means E includes a resilient arm 35, and a resilient arm 36, both of which are constructed identically the same. The resilient arm 35 is connected by means of a binding post or the like 37 to the block of insulation 23, and the resilient arm 36 is connected to the control lever D by means of a pin 38, adjacent to the fulcrum point thereof. These arms are made flexible and their extreme outer free ends are provided with contact points 39, which are adapted to abut when the outer end of the lever is moved to its raised position due to the lowering of the hydrometer F when the specific gravity of the electrolyte changes during the time the battery is under discharge. Inwardly of the contact points 39, the resilient and flexible arms 35 and 36 are provided with permanent magnets 40, which have a tendency to hold the contacts 39 in contact with one another until the lever D has been moved below its horizontal position and the shiftable mass 29 within the vessel 28 has shifted toward the outer end of the lever so that its weight can quickly and forcibly break the contact between the contacts 35 and 36. The binding post 37 has connected thereto an electric lead wire 41, which of course, has electric connection with the resilient arm 35 through the binding post 37. The connecting portion 24 of the bracket 20 has bolted or otherwise secured thereto an outwardly extending arm 42 which is also formed of electric conducting material, and this arm has secured thereto by means of a binding post 43, a lead wire 44. If desired, the improved control B can be directly interposed within the charging circuit for a battery, so as to close the circuit and to permit the charging of the battery when the hydrometer moves downward within the cylindrical extension 12 of the battery jar 10. The leads 41 and 43, however, will, in all probability, lead to the ignition source of an internal combustion engine, utilized for running the generator of a storage battery charging plant, and it can be seen that as soon as the contacts 39 are moved into engagement with each other, the ignition system of the internal combustion engine will be closed, thus starting the operation of the engine and the consequent operation of the generator.

The hydrometer F can be of any preferred or of the usual character, and has been shown merely by way of example to be a sealed tube or bottle 50, the lower end of which is weighted with the correct amount of shot 51. The upper end of the hydrometer has secured thereto a cord 52, which extends through the opening 17 in the battery jar cover and is connected to the inner end of the lever D.

In operation of the improved device, when the specific gravity of the electrolyte in the battery jar falls below a certain specific gravity, the hydrometer 50 will move downwardly within the electrolyte. This, of course, will pull down on the inner end of the lever, and swing the outer end of the lever D upwardly. After the lever has been moved past its horizontal position, the shiftable mass 29 within the vessel 28 will move suddenly forwardly, which will help to forcibly throw the upper end of the lever D upwardly, thus closing the contact quickly to prevent the breaking or arcing of the contacts. This, of course, will set the battery charging plant in operation, as heretobefore described. Now, when the battery becomes charged and the specific gravity of the electrolyte increases, the hydrometer F will, of course, rise within the electrolyte, thus permitting the lowering of the outer end of the lever D under the influence of the shiftable mass within the same. The downward movement of the outer end of the lever D will deform the resilient arms 35 and 36 and the magnets will prevent the disengagement of the contacts 39. However, as soon as the lever D reaches its horizontal position and starts on its downward movement, the changing of the center of gravity of the shiftable mass 29 will cause the forcible rocking of the lever and thus will quickly break the circuit between the contacts 39 and move the contacts some distance from each other and thus prevent the arcing thereof. The block of insulation 23 may carry a suitable adjusting screw 55, to limit movement of the arm 35. The arm 42 will also carry a set screw 56 for limiting the downward movement of the lever D.

From the foregoing description, it can be seen that an improved means has been provided for regulating the operation of storage battery charging plants by the actual condition of the batteries themselves.

Changes in details may be made without departing from the spirit or scope of this invention; but,

I claim:

1. In a control for charging storage batteries, a supporting bracket of electrical conducting material, a rockable lever pivotally secured intermediate its ends to the bracket and formed of electric conducting material, a hydrometer arranged to extend into a storage battery jar, a block of insulation carried by the supporting bracket, resilient electric conducting arms secured respectively to the lever and to the block of insulation, contacts carried by the outer terminals of the arms, and permanent magnets carried by the arms adjacent to the contact points for permitting the quick making and breaking of the contacts.

2. In a control for storage battery charging plants, a supporting bracket, a rockable lever pivotally secured intermediate its ends to the bracket, a hydrometer, means for securing the hydrometer to the inner end of the lever, resilient contacts carried by the brackets and the lever, the outer end of the lever being externally threaded, a receptacle having a relatively long internally threaded neck arranged to receive the threaded end of the rod, and a shiftable mass arranged in said receptacle.

3. In a control for storage battery charging plants, a supporting bracket, a rockable lever pivotally secured intermediate its ends to the bracket, a hydrometer, means for securing the hydrometer to the inner end of the lever, resilient contacts carried by the bracket and the lever, the outer end of the lever being externally threaded, a receptacle having a relatively long internally threaded neck arranged to receive the threaded end of the rod, a shiftable mass arranged in said receptacle, and means movably mounted within said receptacle, for limiting the shifting movement of the mass within said receptacle.

FRANCIS W. CRESS.